(No Model.)
P. C. SCHLECHTMANN.
CORN STALK LOADER.
No. 245,875. Patented Aug. 16, 1881.
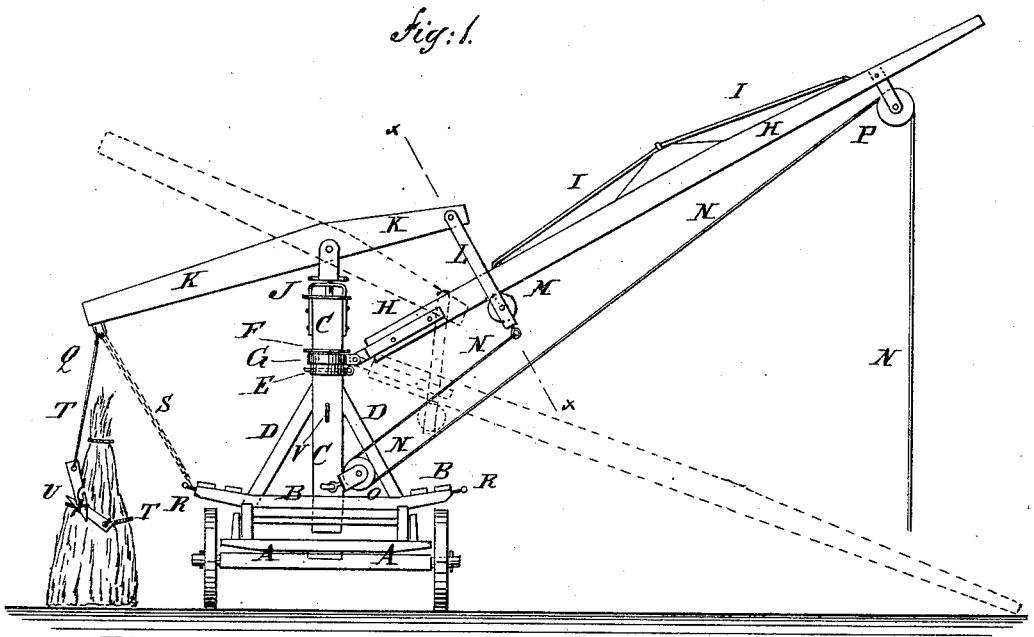
Fig. 1.
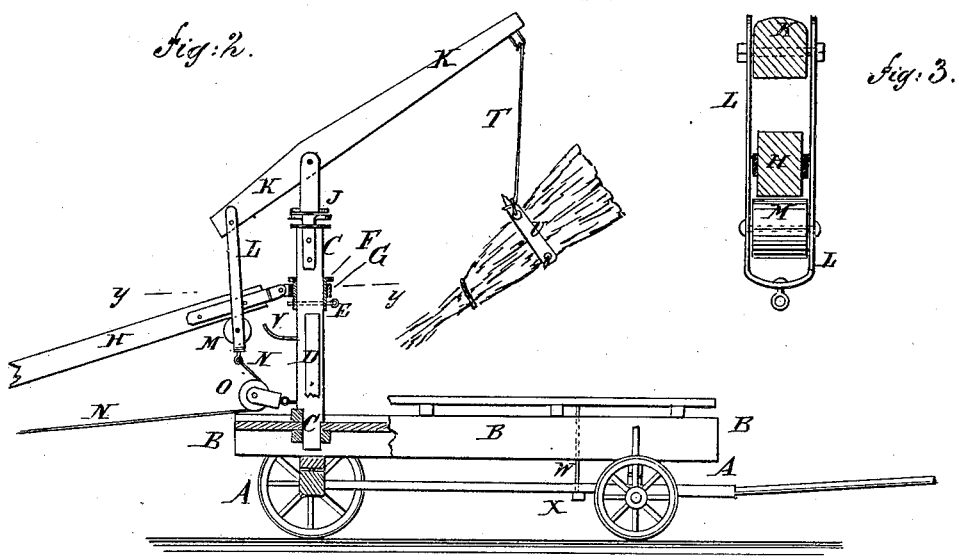
Fig. 2.
Fig. 3.
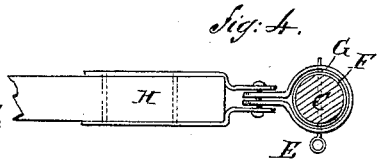
Fig. 4.
WITNESSES:
Chas. Nida
B. G. Underwood
INVENTOR:
P. C. Schlechtmann
BY Munn & Co
ATTORNEYS.

UNITED STATES PATENT OFFICE.

PETER C. SCHLECHTMANN, OF ARLINGTON, WISCONSIN.

CORNSTALK-LOADER.

SPECIFICATION forming part of Letters Patent No. 245,875, dated August 16, 1881.

Application filed June 22, 1881. (No model.)

*To all whom it may concern:*

Be it known that I, PETER C. SCHLECHTMANN, of Arlington, in the county of Columbia and State of Wisconsin, have invented a new and useful Improvement in Cornstalk-Loaders, of which the following is a full, clear, and exact description.

Figure 1 is a side elevation of my improvement, shown as applied to a cornstalk-shock. Fig. 2 shows the shock raised and swung over the wagon-rack. Fig. 3 is a sectional elevation of the levers, taken through the line $x\,x$, Fig. 1. Fig. 4 is a sectional plan view of the post and the inner end of the lower lever, taken through the line $y\,y$, Fig. 2.

The object of this invention is to facilitate the loading and unloading of cornstalks and other substances.

In the accompanying drawings, A represents an ordinary farm-wagon, and B represents an ordinary hay or wagon rack placed upon the said wagon.

To the rear part of the rack B is attached the lower end of a post, C, which is strengthened in position by braces D. The upper ends of the braces D are attached to the opposite sides of the post C, and their lower ends are attached to the side parts of the rack B.

To the post C, at a little distance from its upper end, is secured by a pin, E, or other suitable means, a collar, F, to serve as a bearing for an opening band, G, the ends of which are hinged to the inner end of the lever H. The lever H is strengthened by a truss-rod, I, as shown in Fig. 1.

To the upper end of the post C is secured a swivel, J, to which is fulcrumed a lever, K.

To the short arm of the lever K is hinged a loop or stirrup, L, through which is passed the inner end of the lever H.

To the lower part of the stirrup L is pivoted a roller, M, upon which the lever H rests, and which rolls upon the lower side of the said lever H as the lever is operated.

If desired, the roller M may be replaced by a gear-wheel to engage with a toothed rack-bar attached to the lower side of the lever H.

To the lower end of the stirrup L is attached the end of a rope, N, which is passed around a pulley, O, connected with the lower part of the post C. From the pulley O the rope N passes over a pulley, P, connected with the lower side of the outer part of the lever H.

To the end of the long arm of the lever K is attached a hook, Q, to be hooked into a rope attached to the shock of cornstalks.

To the sides of the rear end of the rack B are attached hooks R, with which the outer arm of the lever K may be connected by a short chain, S, or other suitable means, to hold the levers raised when passing from place to place.

When a shock is to be loaded a rope, T, is passed around it and secured by a needle, U, as shown in Fig. 2. The needles U may be made of wood or iron and have a short rope, T, secured in a hole in their rear ends. The needles U have their forward ends pointed, and have a hole or a hook-notch formed in them near their forward ends. The rope T is passed around the middle part of the shock, and is passed through the hole or notch in the forward part of the needle, and is passed around the forward end of the said needle with a half-hitch. When the shock is to be loaded the free end of the rope T is secured to the hook Q of the lever K and the rope N is drawn upon, which raises the shock, so that by turning the levers H K upon the post C the said shock is swung over and lowered upon the rack B. As many needles U and ropes T are required as there are shocks to be taken at a load.

To the side of the post C is attached a long hook, V, upon which the needles are hung when not in use.

In unloading the shocks the ropes T of the needles U are again attached to the hook Q of the lever K, and the levers are operated as hereinbefore described.

By attaching an ordinary hay-fork to the long arm of the lever K the apparatus can be used for loading hay from the cock, for loading loose barley and other substances.

To prevent the forward end of the rack B from being raised off the forward bolster of the wagon A, the said rack can be anchored to the forward part of the wagon-reach by a rod or chain, W, attached to the said rack, passing through the said reach and secured by a key, X, or other suitable means.

Having thus described my invention, I claim as new and desire to secure by Letters Patent—

1. The combination, with a rope, T, of the needle U, having an eye at its rear end and a hook-notch near its pointed forward end, as and for the purpose specified.

2. In a cornstalk-loader, the combination, with the wagon A and rack B, of the post C, the lever H, connected with the post C by a collar, F, and band G, the lever K, connected with the post C by the swivel J, and with the lever H by a stirrup, L, and roller M, the hoisting-rope N, and the pulleys O P, substantially as herein shown and described, whereby corn-shocks can be readily loaded upon and unloaded from the wagon, as set forth.

PETER C. SCHLECHTMANN.

Witnesses:
CHARLES GINTHER,
GEO. PORT.